United States Patent
Liu

(10) Patent No.: US 10,788,089 B2
(45) Date of Patent: Sep. 29, 2020

(54) SPEED DIFFERENTIAL DEVICE FOR A COMMON DOUBLE OVERRUNNING CLUTCH

(71) Applicant: Jen-Chih Liu, Hsinchu (TW)

(72) Inventor: Jen-Chih Liu, Hsinchu (TW)

(73) Assignee: NEW KAILUNG GEAR CO., LTD, Kaohsiung (TW)

( * ) Notice: Subject to any disclaimer, the term of this patent is extended or adjusted under 35 U.S.C. 154(b) by 0 days.

(21) Appl. No.: 16/261,576

(22) Filed: Jan. 30, 2019

(65) Prior Publication Data

US 2020/0240479 A1 Jul. 30, 2020

(51) Int. Cl.
*F16D 41/16* (2006.01)
*F16H 19/00* (2006.01)
*F16D 11/06* (2006.01)
*F16D 41/12* (2006.01)
*F16D 27/12* (2006.01)

(52) U.S. Cl.
CPC .............. *F16D 41/16* (2013.01); *F16D 11/06* (2013.01); *F16D 27/12* (2013.01); *F16D 41/12* (2013.01); *F16H 19/001* (2013.01); *F16D 2300/22* (2013.01)

(58) Field of Classification Search
CPC .......... F16D 11/06; F16D 41/16; F16D 27/12; F16D 2300/22; F16H 19/001
USPC ........... 475/231; 192/48.1, 41 R, 43, 45.001, 192/45.004, 45.008
See application file for complete search history.

(56) References Cited

U.S. PATENT DOCUMENTS

| | | | | |
|---|---|---|---|---|
| 4,373,407 A | * | 2/1983 | Okubo | F16D 21/06 74/650 |
| 5,971,123 A | * | 10/1999 | Ochab | F16D 27/10 192/38 |
| 5,992,592 A | * | 11/1999 | Showalter | F16D 41/16 192/43.1 |
| 6,244,965 B1 | * | 6/2001 | Klecker | F16D 41/14 464/81 |
| 9,108,615 B2 | * | 8/2015 | Lee | B60W 10/02 |
| 9,416,828 B2 | * | 8/2016 | Rubino | F16D 41/16 |
| 10,208,814 B1 | * | 2/2019 | Reiter | F16D 27/09 |
| 10,434,863 B2 | * | 10/2019 | Spangler | B60K 6/38 |
| 10,533,618 B2 | * | 1/2020 | Kinnes | F16D 41/14 |
| 2018/0038425 A1 | * | 2/2018 | Kimes | F16H 63/304 |

\* cited by examiner

*Primary Examiner* — Leslie A Nicholson, III

(57) ABSTRACT

A speed differential device for a common double overrunning clutch includes a left input unit and a right input unit being combined together as a combination structure; a left input unit 1 with a cam unit and a right output unit with a cam unit being installed with the combination structure of the left input unit and the right input unit; a left rolling post retainer and a plurality of left rolling posts being installed between the left input unit and the left output ring; a right rolling post retainer and a plurality of right rolling posts being installed between the right input unit and the right output unit; the left rolling post retainer being installed with a left returning spring; the right rolling post retainer being installed with a right returning spring; the left returning spring and the right returning spring being interacted with a clutch unit.

7 Claims, 14 Drawing Sheets

SPEED DIFFERENTIAL DEVICE FOR A COMMON DOUBLE OVERRUNNING CLUTCH

FIELD OF THE INVENTION

The present invention is related to speed differential device, and in particular to a speed differential device for a common double overrunning clutch.

BACKGROUND OF THE INVENTION

General a speed differential device is installed with a clutch unit which is used to switch the moving forwards and backwards in moving of a car such as those described in U.S. Pat. No. 5,971,123, an inner annular surface of an outer of a power input unit of a clutch is installed with a cam which not only affect the strength of an outer ring thereof, but also reduce the bearing ability of the outer ring is reduced.

Moreover, disposition of left and right rolling posts of the speed differential device causing that the wheels are locked cannot be prevented. The speed differential structure may be locked due to the transient acceleration, deceleration, and seed reduction in moving forwards and backwards of the speed differential structure. Therefore, it is possible that the rolling posts are deadly buckled and thus the wheel at the side is deadly locked.

The prior art serves to improve above mentioned defects, but as a result, the structure is complicated, the cost is high, the weight is heavy and times for assembling is long. To improve the wheel rotation speed is speeder than the operation speed of the engine to cause that the baking function is not use, the structure disclosed in the patent increases more elements to resolve this problem. The disposition of left and right rolling posts to cause that the wheels are locked can be prevented. The speed differential structure with a cam can prevent that the speed differential structure to be locked due to the transient acceleration, deceleration, and seed reduction in moving forwards and backwards of the speed differential device. Therefore, the present invention provides a safety structure.

However, the main problem is to design a speed differential device for a clutch to have higher bearing ability and higher strength. Disposition of left and right rolling posts to cause that the wheels are locked can be prevented. The speed differential device with a cam can prevent that the speed differential device to be locked due to the transient acceleration, deceleration, and seed reduction in moving forwards and backwards of the speed differential device. It can be used both in two wheel and four wheel structure, and in two wheel structure with engine braking. Therefore, the present invention provides a safety structure.

SUMMARY OF THE INVENTION

Accordingly, the object of the present invention is to provide a speed differential device for a common double overrunning clutch device, which can overcome the defects of the prior art. The present invention has the following advantages. 1. A cam is installed to the output ring to promote the strength of whole structure so as to have a higher bearing ability. 2. It is used both in two wheel and four wheel structure, and in two wheel structure with function of engine braking. 3. The disposition of left and right rolling posts to cause that the wheels are locked can be prevented. The speed differential device with a cam can prevent that the speed differential device to be locked due to the transient acceleration, deceleration, and seed reduction in moving forwards and backwards of the speed differential device. Therefore, the present invention provides a safety structure. 4. The structure of the present invention is simple, concrete, and novel.

To achieve above object, the present invention provides a speed differential device for a common double overrunning clutch, comprising: a left input unit (1) and a right input unit (2) being combined together as a combination structure; a left input unit (1) with a cam unit (101) and a right output unit (20) with a cam unit (201) being installed with the combination structure of the left input unit (1) and the right input unit (2); a left rolling post retainer (3) and a plurality of left rolling posts (3A) being installed between the left input unit (1) and the left output ring (10); a right rolling post retainer (4) and a plurality of right rolling posts (4A) being installed between the right input unit (2) and the right output unit (20); the left rolling post retainer (3) being installed with a left returning spring (30); the right rolling post retainer (4) being installed with a right returning spring (40); the left returning spring (30) and the right returning spring (40) being interacted with a clutch unit; the clutch unit containing a left claw (5), a left claw spring (50), a left ratchet wheel (51), a right claw (6), a right claw spring (60), a right ratchet where (61) and a ratchet claw control ring (7) for controlling synchronous actions of the left claw (5) and the right claw (6).

The left claw (5) controlled by the claw control ring (7) is used to buckle the left ratchet wheel (51); a damping unit (9) is installed between the left ratchet wheel (51) and the left rolling post retainer (3). The damping unit is one of a friction sheet, a spring and a magnetic device which can generate damping force. The left claw control ring (7), left rolling post retainer (3) and right rolling post retainer (4) are installed with a returning spring. The claw control ring interacted with the external power unit has a linking rod (70) which is inserted into a notch (140) of an interacted unit (14) so that the claw control ring (7) is interacted with the interacted unit; the interacted unit (14) is installed with a protrusion (141), the returning spring (71) of the claw control ring (7) is installed around the left input unit (1) and a fixing shaft (15) is used to installed the returning spring (71) of the claw control ring (7), while a protrusion (141) is installed between the fixing shaft (15) and the returning spring (71) of the claw control ring (7), when the interacted unit (14) rotates, the protrusion (141) rotates with the returning spring (71) of the claw control ring (7) so that the returning spring (71) of the claw control ring (7) acts; and the interacted unit (14) is installed with a damping unit (9) for being interacted with the external power unit (8).

The claw control ring (7) interacted with the external power unit (8) is interacted with the sun gear; the sun gear (11) is engaged with at least one planet gear (12); the claw control ring (7) has a returning spring (71) which is located at a retaining shaft (120) of the planet gear (12); the sun gear (11) is installed with a damping unit (9) for interacting with the external power unit (8). An outer side of the left input unit (1) and the right input unit (2) has an inner gear which is engaged with a planet gear (12); the inner gear is installed with a damping unit (9) for interacting by the external power unit (8).

BRIEF DESCRIPTION OF THE DRAWINGS

FIG. 34 FIG. 3 is a cross sectional view along line A-A of FIG. 2 (in the moving case of two wheel drive changing into four wheel transfer).

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
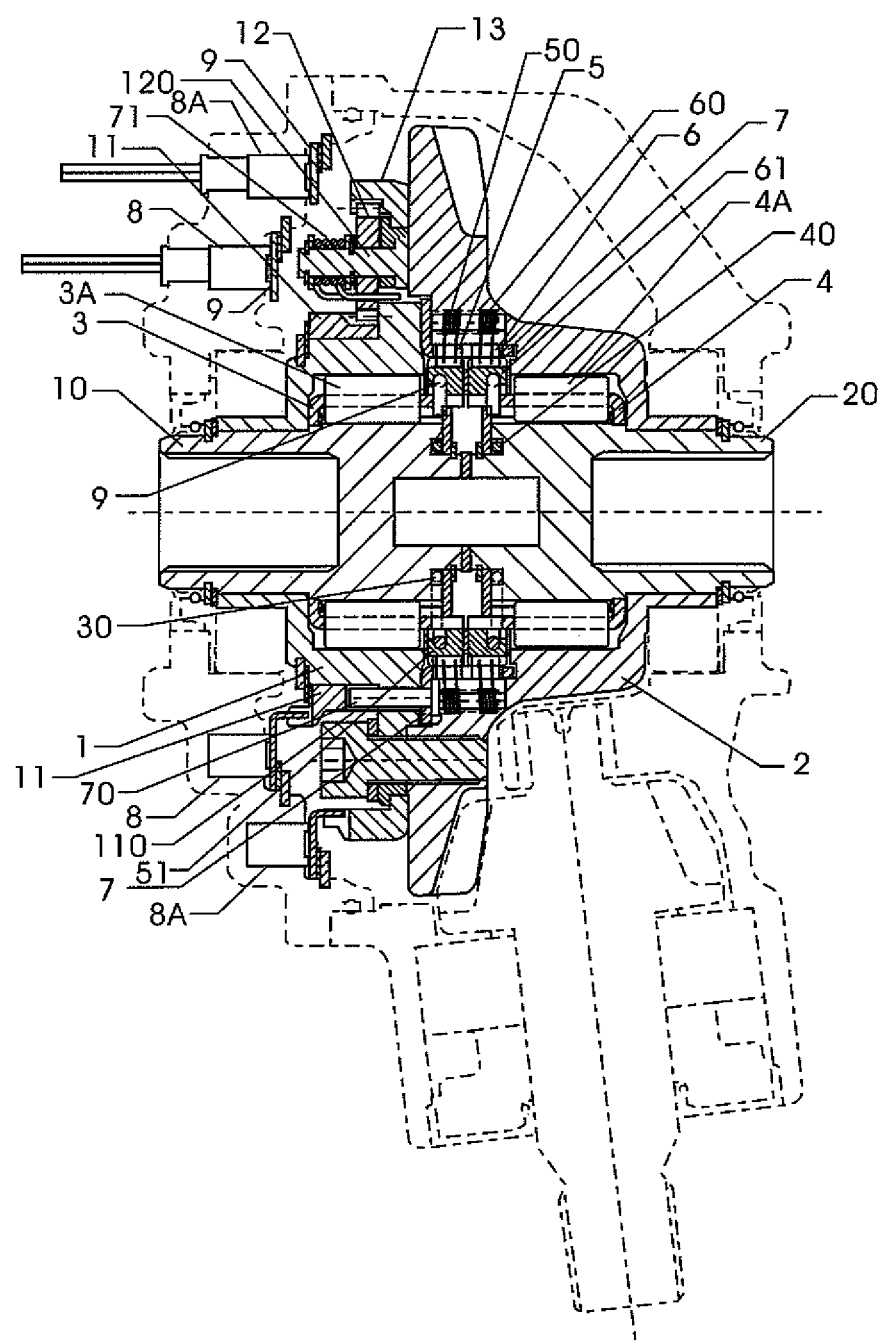
FIG. 1 shows the embodiment of the present invention.
Figure 2:
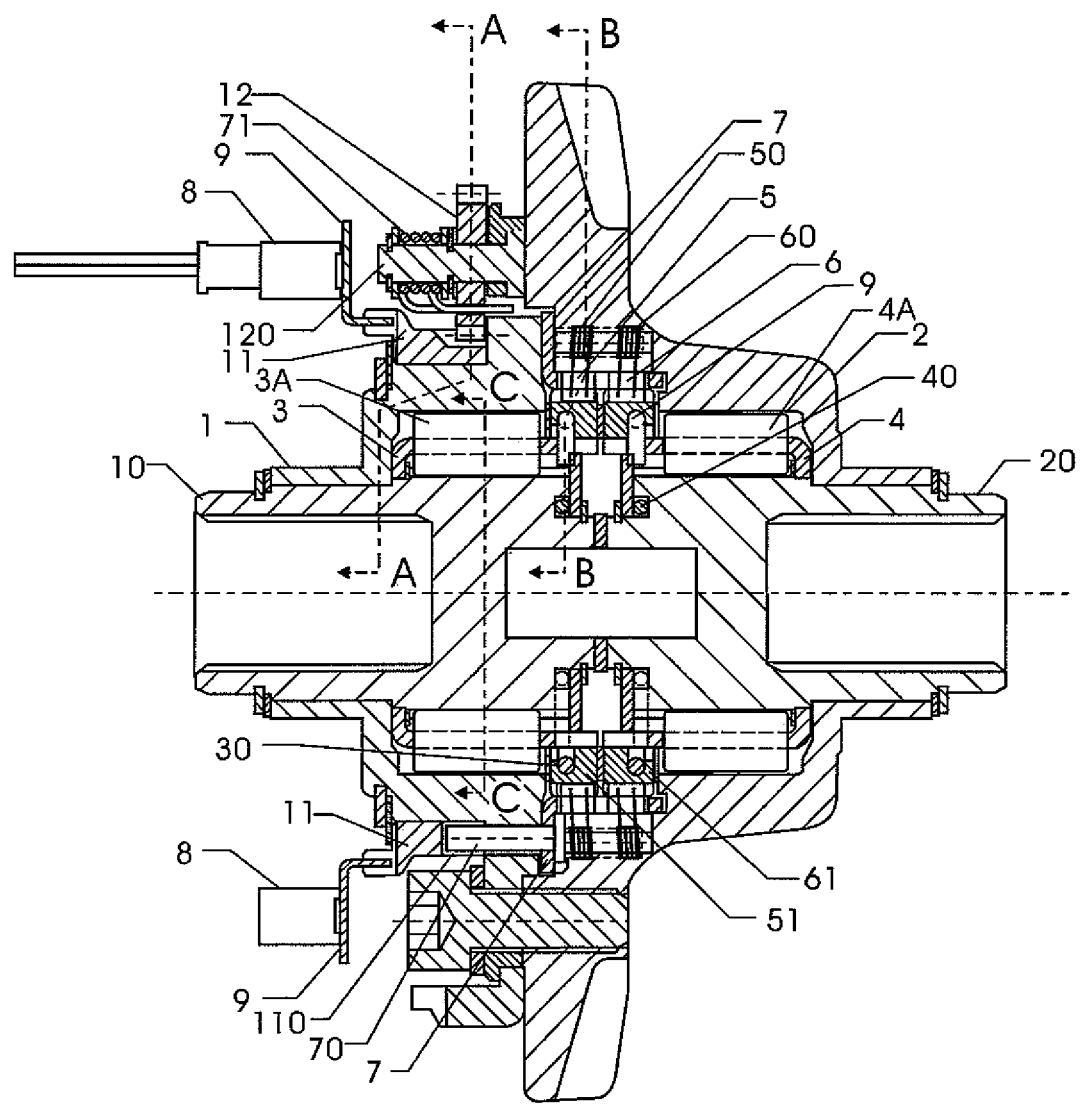
FIG. 2 shows that the present invention is applied to a power drive of two wheel and four wheel structure.
Figure 12:
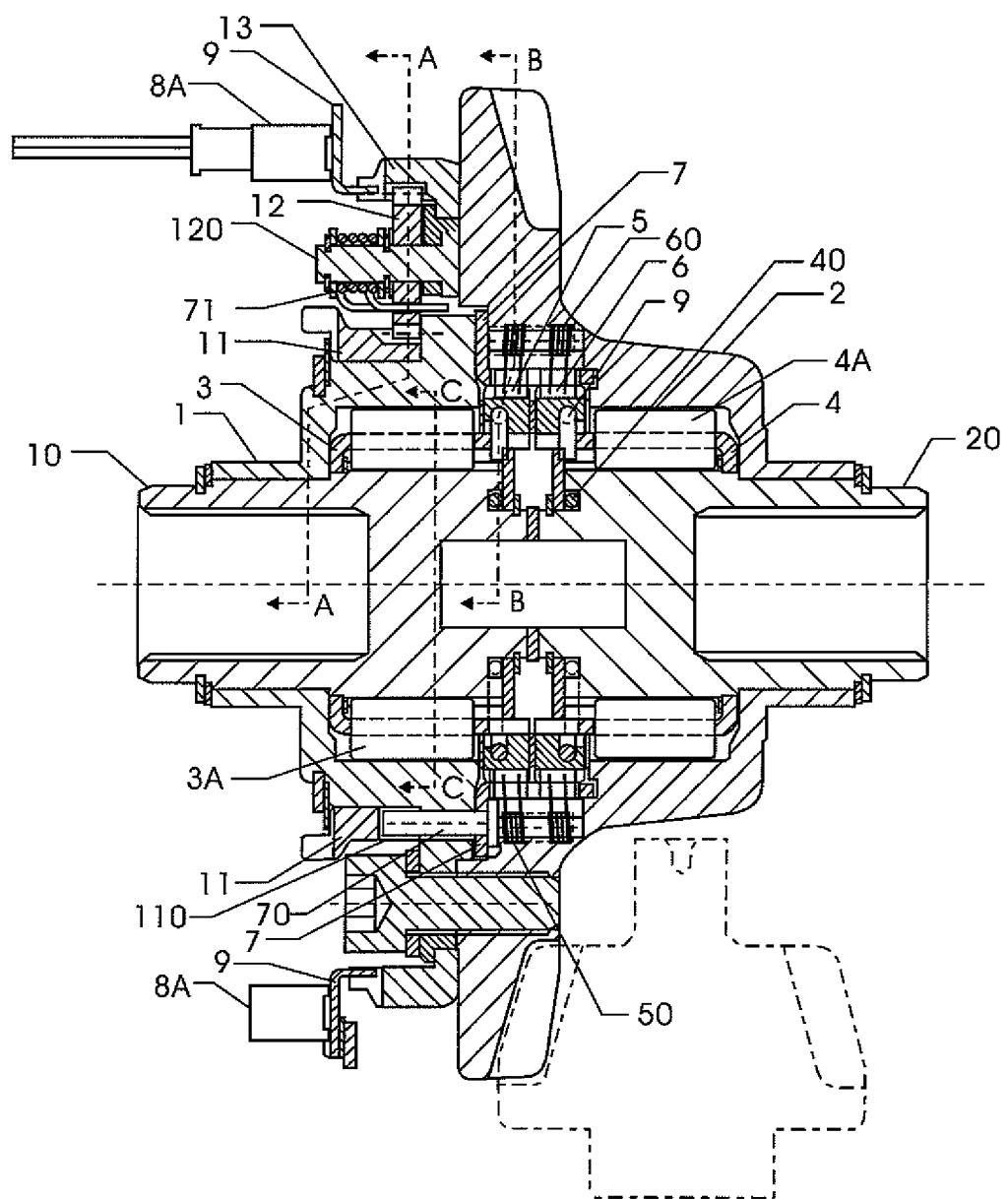
FIG. 12 shows another embodiment of the present invention in the state of two wheel drive and no braking function.
Figure 31:
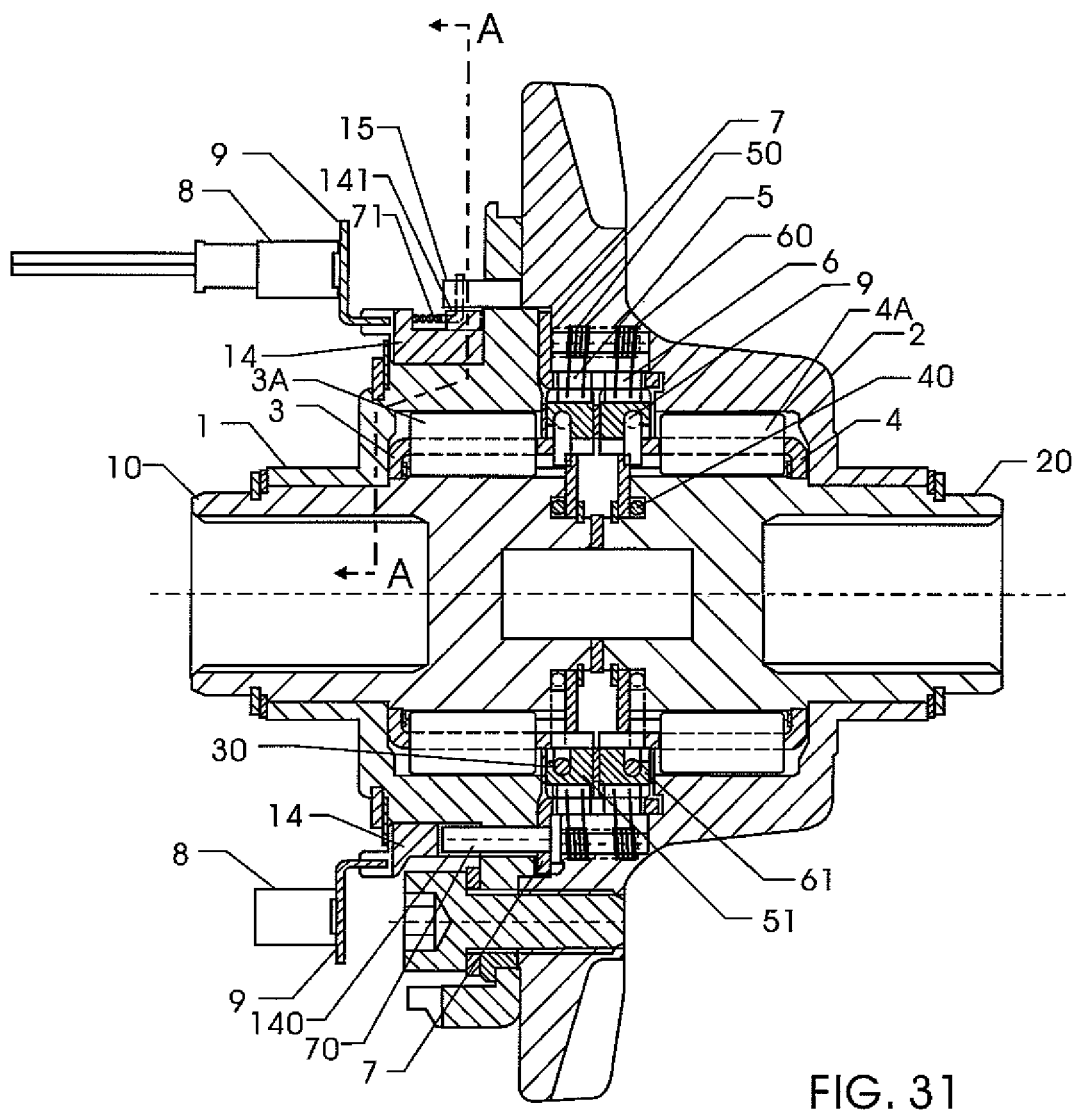
FIG. 31 is a further embodiment of the present invention, which is a simple application in two wheel and four wheel drives.

FIG. 1 shows the embodiment of the present invention. FIGS. 2 and 12 are application of FIG. 1. FIG. 31 is another embodiment of the present invention. The structure in FIG. 1 contains the embodiment of two wheel and four wheel drive and FIG. 12 is the embodiment about the two wheel drive and engine braking. The embodiments in FIGS. 2, 12 and 31 have the same technology features, but use in different conditions. The differential devices shows in FIGS. 1, 2, 12 and 31 contains the following elements.

A left input unit 1 and a right input unit 2 are combined together as a combination structure. A left input unit 1 with a cam unit 101 and a right output unit 20 with a cam unit 201 are installed with the combination structure of the left input unit 1 and the right input unit 2. A left rolling post retainer 3 and a plurality of left rolling posts 3A are installed between the left input unit 1 and the left output ring 10. A right rolling post retainer 4 and a plurality of right rolling posts 4A are installed between the right input unit 2 an the right output unit 20. The left rolling post retainer 3 is installed with a left returning spring 30. The right rolling post retainer 4 is installed with a right returning spring 40. They are interacted with a clutch unit. The clutch unit contains a left claw 5, a left claw spring 50, a left ratchet wheel 51, a right claw 6, a right claw spring 60, a right ratchet where 61 and a claw control ring 7 for controlling synchronous actions of the left claw 5 and the right claw 6. The claw control ring 7 is interacted with an external power unit 8 (such as a magnetic unit for generating absorption force).

Figure 25:
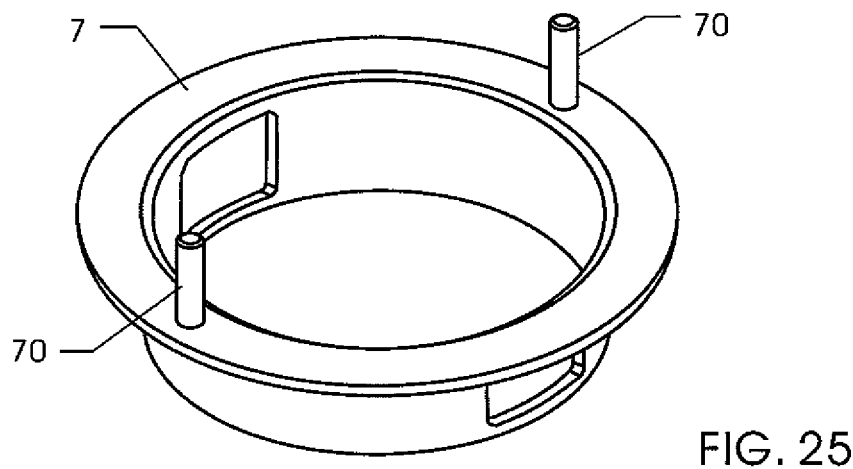
FIG. 25 shows the claw control ring of the present invention.
Figure 26:
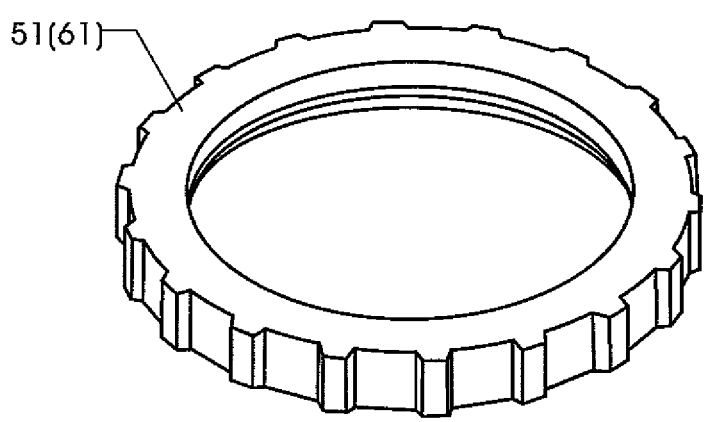
FIG. 26 shows the ratchet wheel of the present invention.
Figure 27:
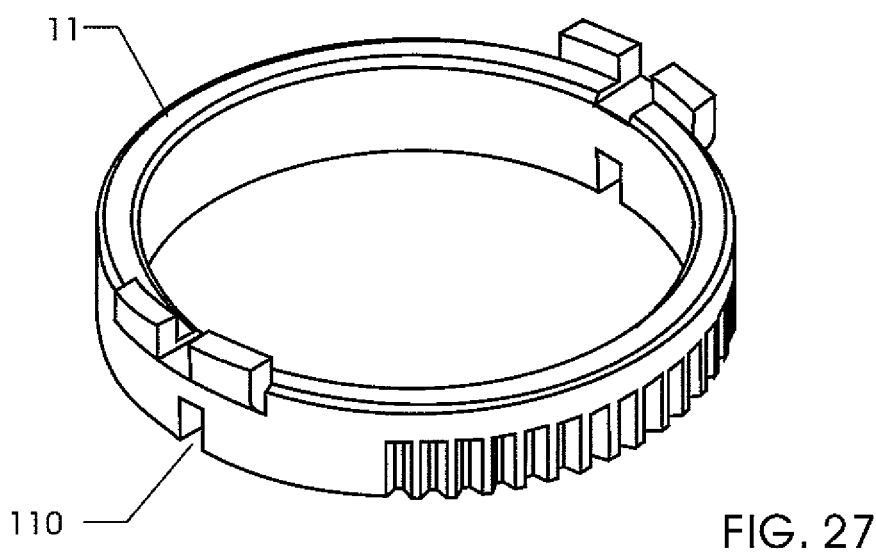
FIG. 27 shows the sun gear of the present invention.
Figure 28:
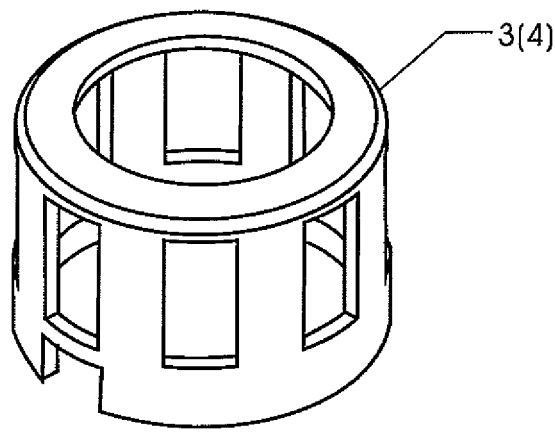
FIG. 28 shows the rolling post retainer of the present invention.
Figure 29:
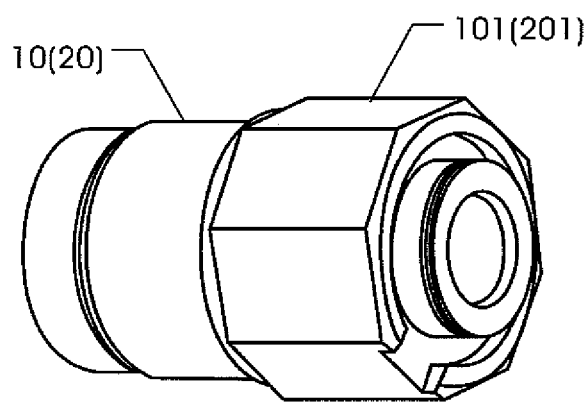
FIG. 29 is a front view of the out ring of the present invention.
Figure 30:
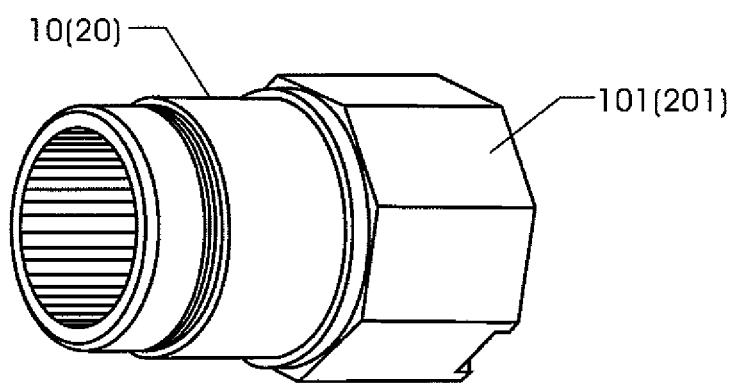
FIG. 30 is a rear view of the output ring of the present invention.

With reference to FIG. 25, the left claw 5 controlled by the claw control ring 7 is used to buckle the left ratchet wheel 51. A damping unit 9 is installed between the left ratchet wheel 51 and the left rolling post retainer 3, see FIG. 4. The right claw 6 controlled by the claw control ring 7 is used to buckle the right ratchet wheel 61. A damping unit 9 is installed between the right ratchet wheel 61 and the right rolling post retainer 4. The damping unit may be a friction sheet, a spring or a magnetic device which can generate damping force).

The claw control ring 7 interacted with the external power unit 8, see FIGS. 25, 2, 12, has a linking rod 70 which is inserted into a notch 110 of the sun gear 11 (referring to FIG.

27) so that the claw control ring 7 is interacted with the sun gear 11. The sun gear 11 is engaged with at least one planet gear 12. The claw control ring 7 has a returning spring 71 which is located at a retaining shaft 120 of the planet gear 12. The sun gear 11 is installed with a damping unit 9 for interacting with the external power unit 8.

Figure 32:
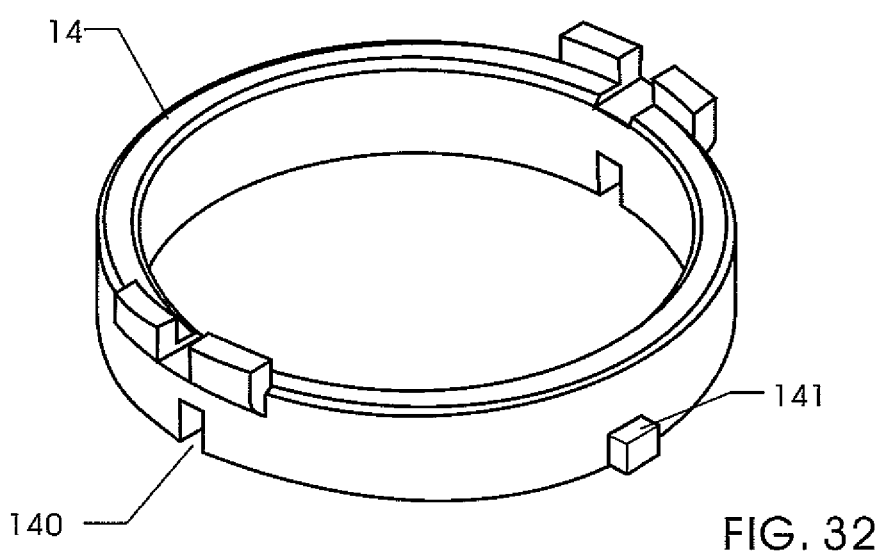
FIG. 32 shows the linking unit of the present invention.
Figure 33:
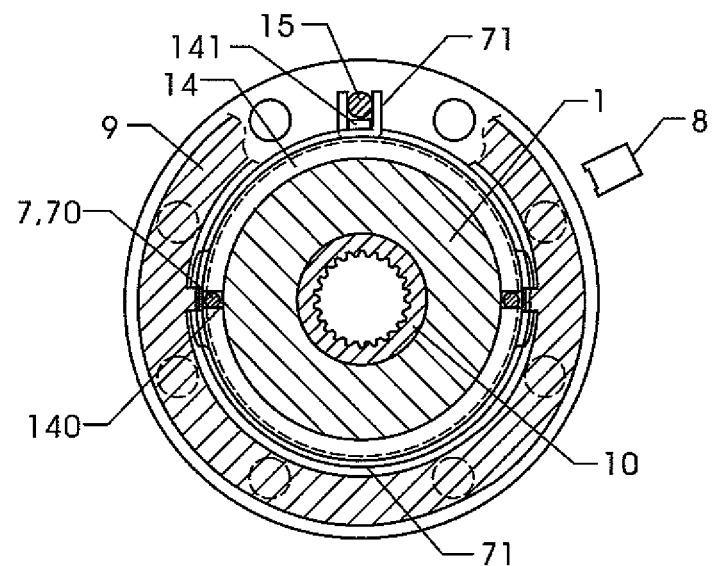
FIG. 33 is a cross sectional view along line A-A of FIG. 31 (in the case of two wheel drive under an immobile, still state).
Figure 34:
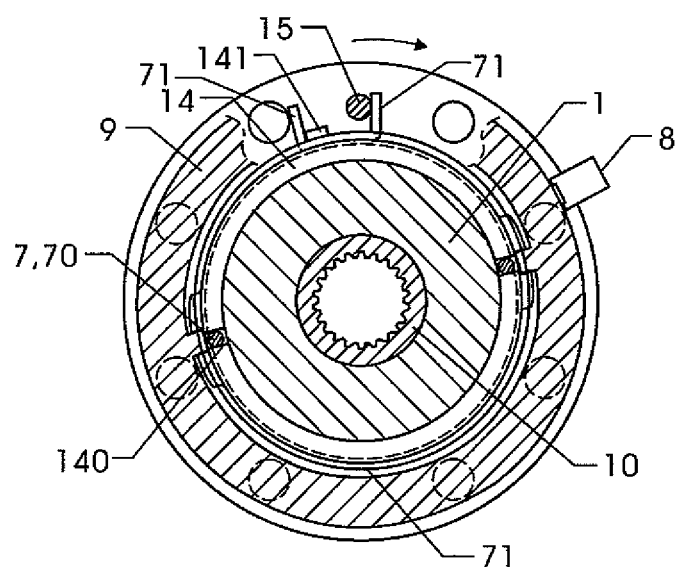

The claw control ring 7 interacted with the external power unit 8 (referring to FIGS. 25, 31) has a linking rod 70 which is inserted into a notch 140 of an interacted unit 14 (referring to FIG. 32) so that the claw control ring 7 is interacted with the interacted unit 14. The interacted unit 14 is installed with a protrusion 141, as illustrated in FIGS. 33 and 34. The returning spring 71 of the claw control ring 7 is installed around the left input unit 1 and a fixing shaft 15 is used to install the returning spring 71 of the claw control ring 7, while a protrusion 141 is installed between the fixing shaft 15 and the returning spring 71 of the claw control ring 7. When the interacted unit 14 rotates, the protrusion 141 rotates with the returning spring 71 of the claw control ring 7 so that the returning spring 71 of the claw control ring 7 acts. The interacted unit 14 is installed with a damping unit 9 for being interacted with the external power unit 8.

With reference to FIGS. 2 to 12, the difference between this the present invention to the former embodiment is that the later embodiment uses to engine braking of a two wheel drive. In the later embodiment, the outer side of the combination of the left input unit 1 and the right input unit 2 is installed with an inner gear 13 which is engaged with a planet gear 12. The inner gear 13 is installed with a damping unit 9 which is interacted by the external power unit 8 so that when the wheel rotation speed is greater than that of the engine, the inner gear 13 and the damping unit 9 interacted with the external power unit 8 will cause that the wheel speed (such as moving along a downward slope) is not quick than the rotation of the engine. Therefore, it has the function of engine braking.

The affect of the present invention is illustrated in FIGS. 3 to 11, which is applied to the embodiment of two wheel drive and four wheel drive as illustrated in FIG. 2 and the later embodiment shown in FIG. 12 for two wheel drive and the engine braking. The operation of these embodiments will be described herein.

Figure 3:
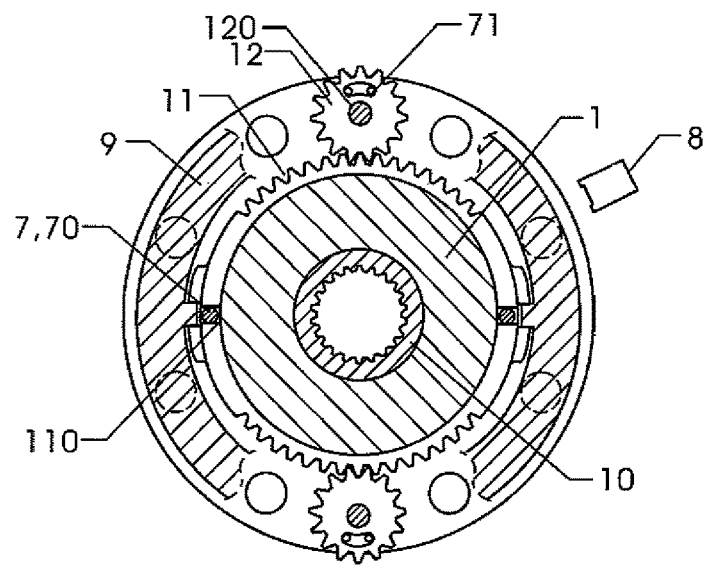
FIG. 3 is a cross sectional view along line A-A of FIG. 2 (in the case of two wheel power drive under an immobile, still state).
Figure 4:
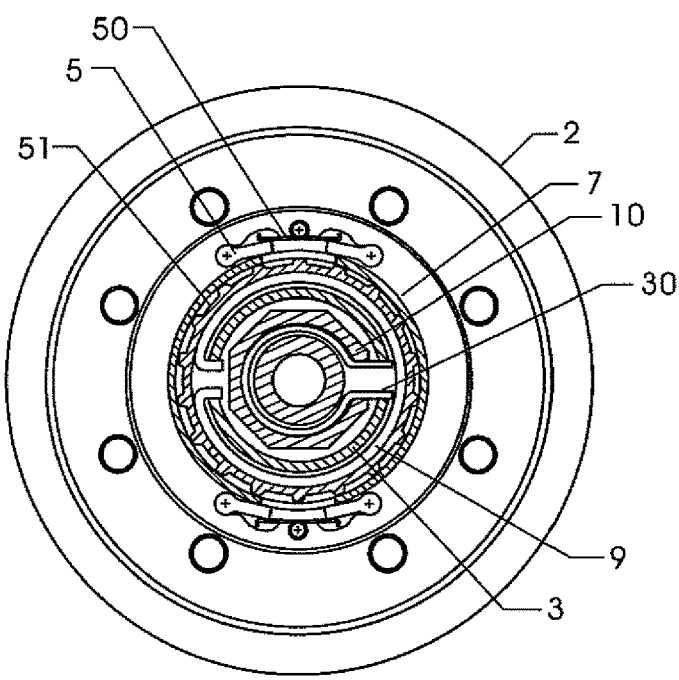
FIG. 4 is a cross sectional view along line B-B of FIG. 2 (in the case of two wheel power transfer under an immobile, still state).
Figure 5:
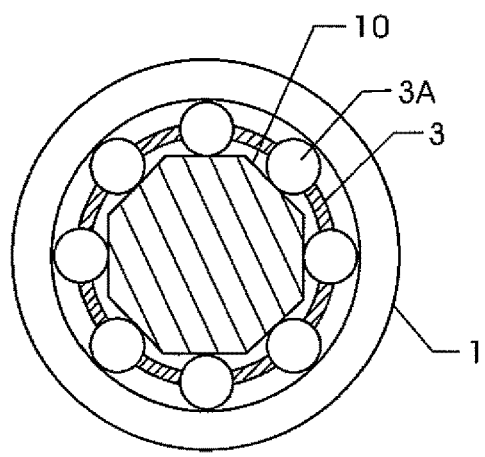
FIG. 5 is a cross sectional view along line C-C of FIG. 2 (in the case of two wheel power transfer under an immobile, still state).

FIGS. 2 to 11 show the embodiment of the present invention, which is used in two wheel drive and four wheel drive. FIGS. 3 to 5 show the embodiment of two wheel drive, while the device is immobile. FIG. 3 shows that all the parts are immobile, and the external power unit 8 has no power. The returning spring 71 of the left claw control ring 7 is buckled so that the left input unit 1 is aligned to the planet gear 12. FIG. 4 shows that all parts are immobile. The left claw 5 is not in contact with the left ratchet wheel 51. The returning spring 30 of the left rolling post retainer 3 is buckled to the left rolling post retainer 3 an the notch of the left output ring 10. FIG. 5 shows that all parts are immobile and the left rolling posts 3A are not engaged and no power is outputted.

Figure 6:
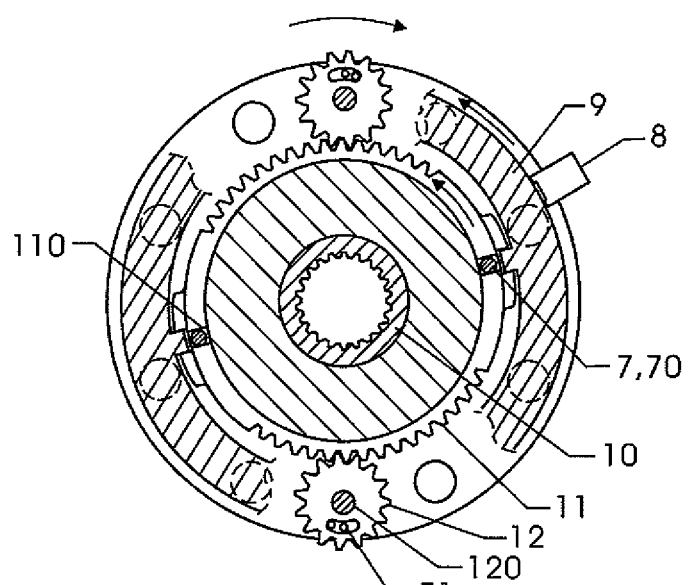
FIG. 6 is a cross sectional view along line A-A of FIG. 2 (in the case of moving forwards when the state of two wheel drive is changed to that of four wheel drive).
Figure 7:
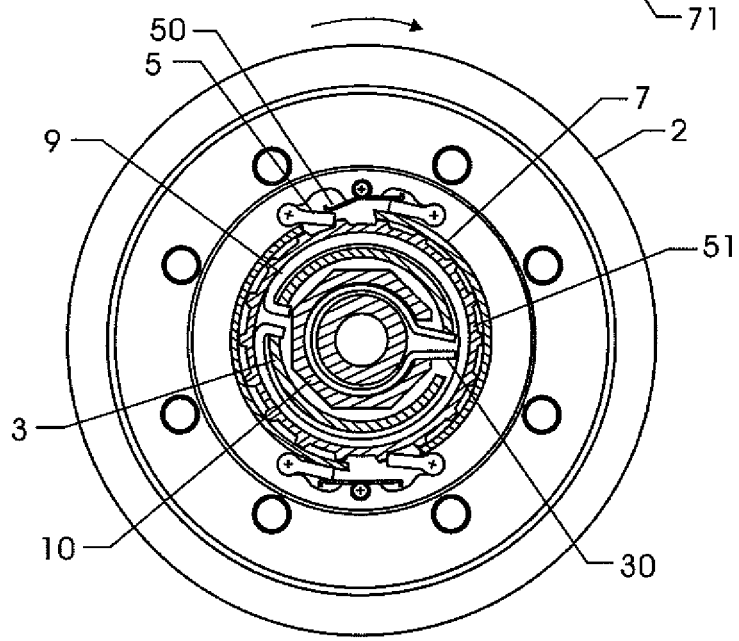
FIG. 7 is a cross sectional view along line B-B of FIG. 2 (in the case of moving forwards when the state of two wheel drive is changed to that of four wheel drive).
Figure 8:
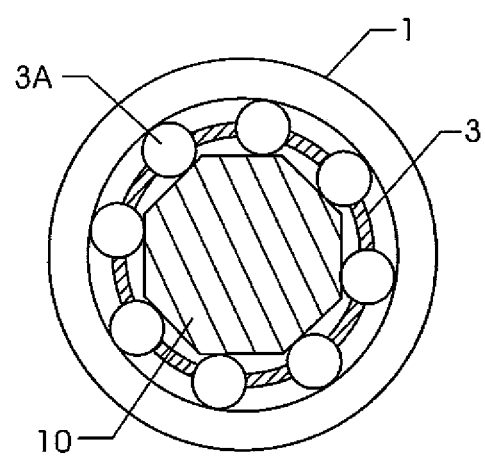
FIG. 8 is a cross sectional view along line C-C of FIG. 2 (in the case of moving forwards when the state of two wheel drive is changed to that of four wheel drive).

FIGS. 6 to 8 show a moving forward state in that the two wheel drive is change to the four wheel drive. FIG. 6 show that the retaining shaft 120 of the planet gear 12 is fixed to the left input unit 1 so that the left input unit 1, the right input unit 2 and the retaining shaft 120 of the planet gear 12 are combined as an integral structure.

The planet gear 12 and the returning spring 71 of the left claw control ring 7 are installed on the fixing shaft 120. The returning spring 71 of the claw control ring 7 is buckled to the left input unit 1 and the planet gear 12. The left claw control ring 7, the damping unit 9 and the sun gear 11 are acted. The external power unit 8 is powered and the damping unit 9 will drive the left claw control ring 7 and the sun gear 11 to move along an opposite direction. The planet gear 12 rotates along the sun gear 11. The planet gear 12 drives the returning spring 71 of the left claw control ring 7 to rotate. With reference to FIG. 7, the left claw 5 and the left claw spring 50 are installed on the right input unit 2. The right input unit 2, left claw 5 and the left claw spring 50 are formed as an integral body. When the external power unit 8 is powered, the damping unit 9 drives the left claw control ring 7 and the sun gear 11 to move along an opposite direction. The left claw control ring 7 and the right input unit 2 are separated. The left claw 5 is pushed by the left claw spring 50 to engage the left ratchet wheel 51 so that the damping unit 9 will push the left rolling post retainer 3. The left rolling post retainer 3 pushes the returning spring 30 thereof to rotate. With reference to FIG. 8, the left rolling post retainer 3 pushes the left rolling posts 3A so that the left input unit 1 engages the left rolling post 3A and the left output ring 10 so that power is outputted to the wheels.

Figure 9:
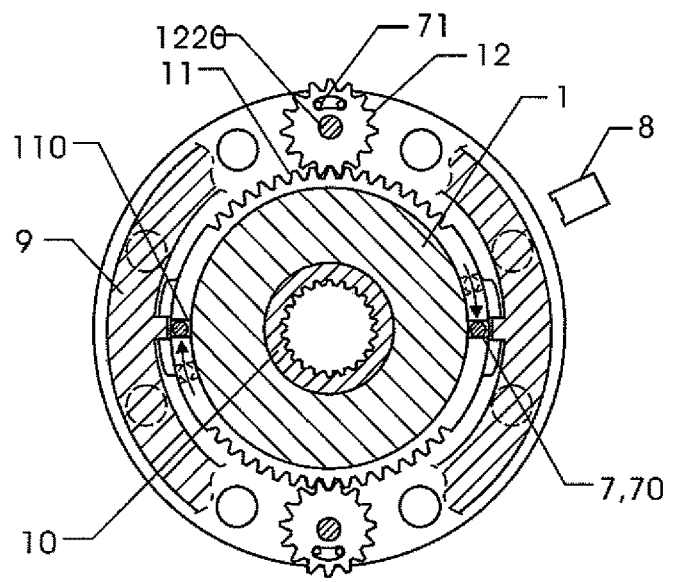
FIG. 9 is a cross sectional view along line A-A of FIG. 2 (in the case of moving forwards when the state of four wheel power drive is changed to that of two wheel drive).
Figure 10:
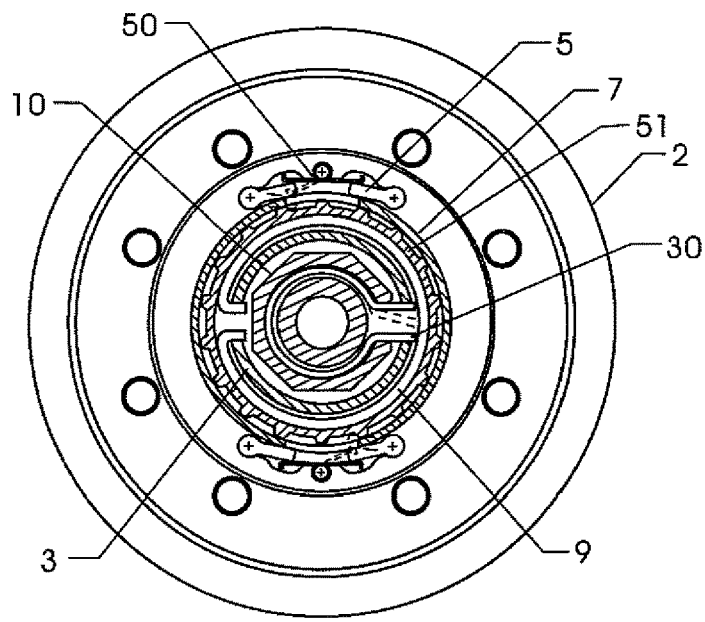
FIG. 10 is a cross sectional view along line B-B of FIG. 2 (in the case of moving forwards when the state of four wheel power drive is changed to that of two wheel drive).
Figure 11:
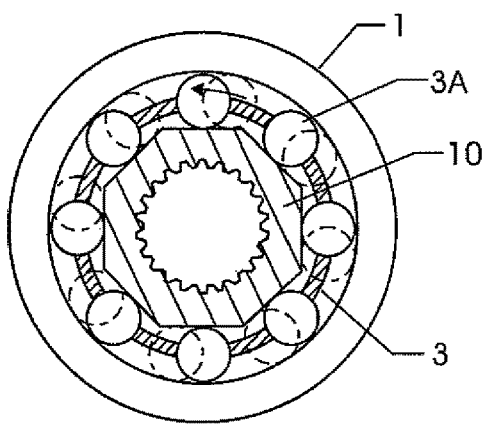
FIG. 11 is a cross sectional view along line C-C of FIG. 2 (in the case of moving forwards when the state of four wheel power drive is changed to that of two wheel drive).

With reference to FIGS. 9 to 11, it shows a state that a four wheel drive is transferred to two wheel drive. In FIG. 9 the external power unit 8 has no power. The returning spring 71 of the left claw control ring 7 pushes the planet gear 12 to align with the notch of the left input unit 1. At the same time, the planet gear 12 drives the sun gear 11 to rotate to the gear engagement position. The sun gear 11 also pushes the left claw control ring 7 to return to the original position. With reference to FIG. 10, the planet gear 12 drives the sun gear 11 and the left claw control ring 7 to return. At the same time, the left claw control ring 7 separates the left claw 5. The returning spring 30 of the left rolling post retainer 3 pushes the left rolling post retainer 3 to be aligned with the notch of the left output ring 10. With reference to FIG. 11, the returning spring 30 of the left rolling post retainer 3 pushes the left rolling post retainer 3 return to align with the notch of the left output ring 10. The left rolling post retainer 3 separates the left rolling post 3A and thus the left rolling post 3A does not output power.

Figure 13:
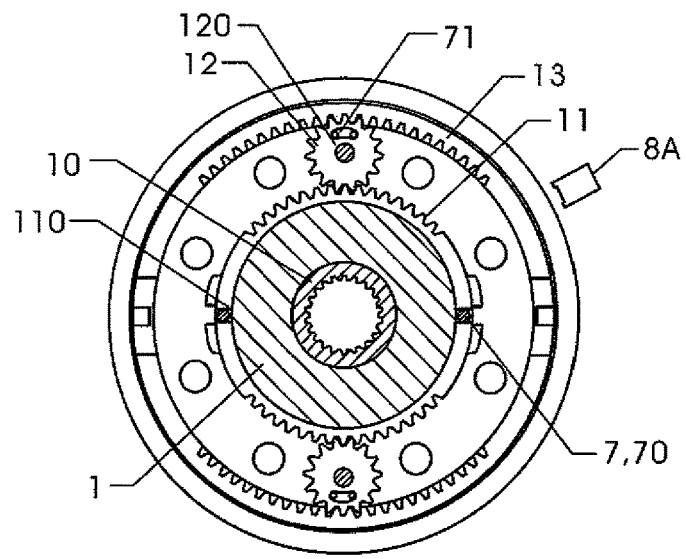
FIG. 13 is a cross sectional view along line A-A of FIG. 12 (in the case of two wheel drive under an immobile, still state).
Figure 14:
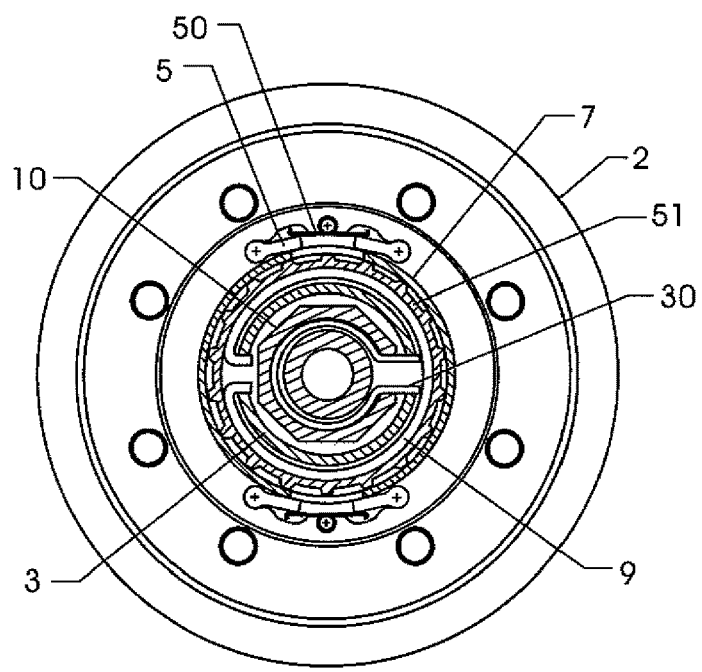
FIG. 14 is a cross sectional view along line B-B of FIG. 12 (in the case of two wheel drive under an immobile, still state).
Figure 15:
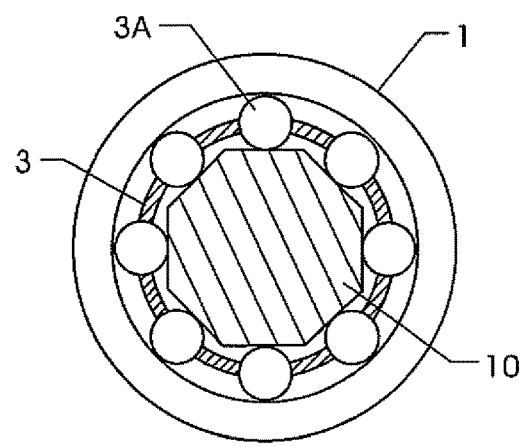
FIG. 15 is a cross sectional view along line C-C of FIG. 12 (in the case of two wheel drive under an immobile, still state).

With reference to FIGS. 12 to 21, a two wheel drive is applied to the brake of an engine. With reference to FIGS. 13 to 15 shows the system is immobile in a state of two wheel drive. In FIG. 13, all parts are immobile. The external power unit 8 has no power. The returning spring 71 of the left claw control ring 7 is buckled to the notches of the left input unit 1 and the planet gear 12. With reference to FIG. 14, all parts are not operated and the left claw 5 does not contact the left ratchet wheel 51. The returning spring 30 of the left rolling post retainer 3 is buckled to the notch of the left rolling post retainer 3 and the left output ring 10. With reference to FIG. 15, all parts are immobile and the left rolling post 3A is not engaged and thus no power is outputted.

Figure 16:
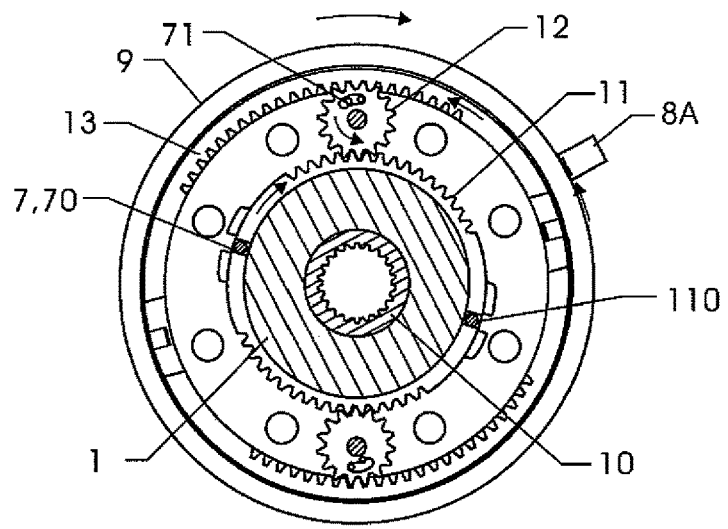
FIG. 16 is a cross sectional view along line A-A of FIG. 12 (in the case of engine braking under the state of moving forwards).
Figure 17:
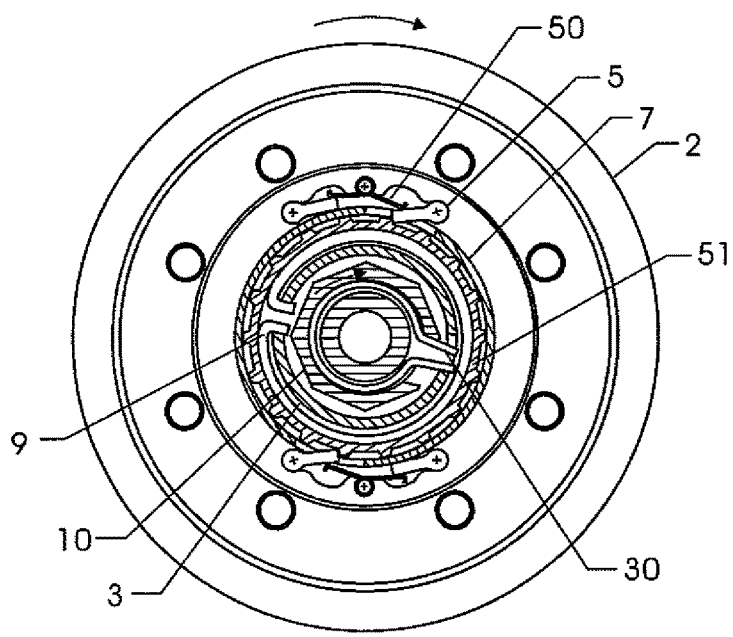
FIG. 17 is a cross sectional view along line B-B of FIG. 12 (in the case of engine braking under the state of moving forwards).
Figure 18:
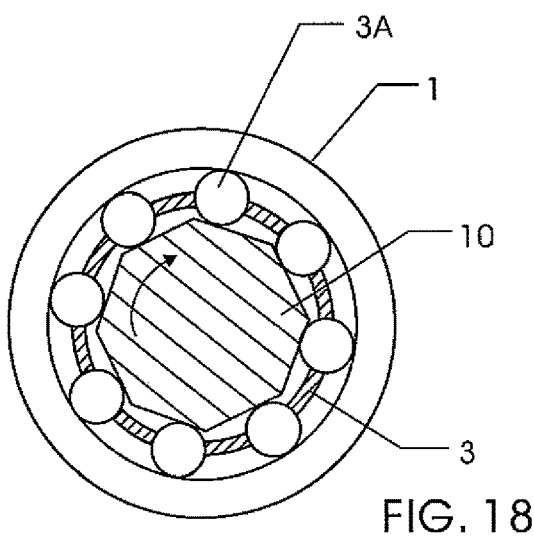
FIG. 18 is a cross sectional view along line C-C of FIG. 12 (in the case of engine braking under the state of moving forwards).

With reference to FIGS. 16 to 8, it shows the action as the engine being in a braking state. In FIG. 16, the retaining shaft 120 of the planet gear 12 is fixed to the left input unit 1. The left input unit 1, right input unit 2 and the fixing shaft 120 of the planet gear 12 are formed as an integral body. The planet gear 12 and the returning spring 71 of the left claw control ring 7 are engaged with the fixing shaft 120. The returning spring 71 of the left claw control ring 7 is buckled to the left input unit 1 and the planet gear 12. The damping unit 9 is connected to the inner gear 13 so that they act synchronously. The sun gear 11 and the left claw control ring 7 are connected so that they act synchronously. The external power unit 8 is powered. The damping unit 9 will drive the inner gear 13 to move along an opposite direction. The planet gear 12 rotates and drives the sun gear 11 to rotate along a moving direction. At the meanwhile, the sun gear 11 pushes the left claw control ring 7 to rotate. The planet gear 12 also pushes the returning spring 71 of the left claw control ring 7 to rotate. With reference to FIG. 17, since the sun gear 11 pushes the left claw control ring 7 to rotate along the moving direction, the left claw control ring 7 and the right input unit 2 separate. The left claw 5 is pushed by the left claw spring 50 and then is engaged with the left ratchet wheel 51. Power is transferred to the left rolling post retainer 3. When a car moves along a downward slope, the speed of the left output ring 10 is larger than that of the left rolling post retainer 3, the left output ring 10 pushes the returning spring 30 of the left rolling post retainer 3. With reference to FIG. 18, when the car moves along a downward slope, the speed of the left output ring 10 is quicker than that of the left rolling post retainer 3, the left output ring 10 causes the left output ring 10, the left rolling post 3A and the left input unit 1 are engaged. Therefore, power is transferred back to engine to brake the car.

Figure 19:
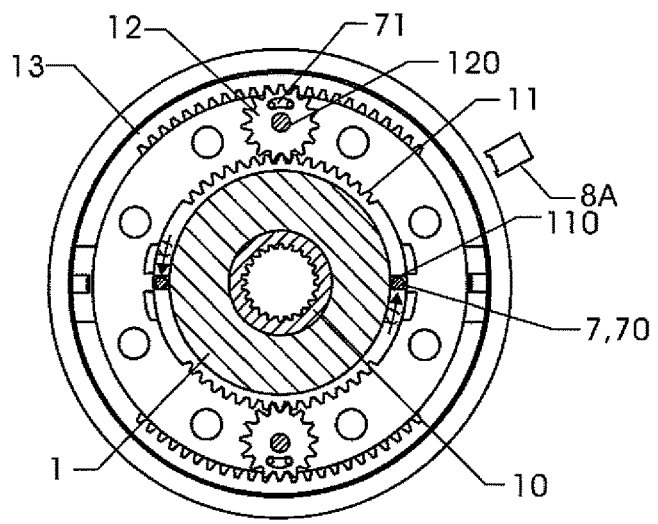
FIG. 19 is a cross sectional view along line A-A of FIG. 12 (in the case of from engine braking returning to two wheel drive state).
Figure 20:
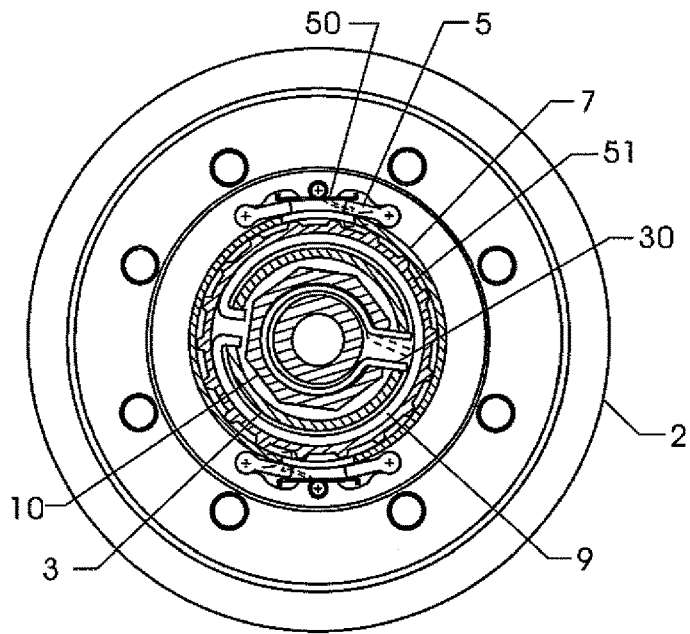
FIG. 20 is a cross sectional view along line B-B of FIG. 12 (in the case of from engine braking returning to two wheel drive state).
Figure 21:
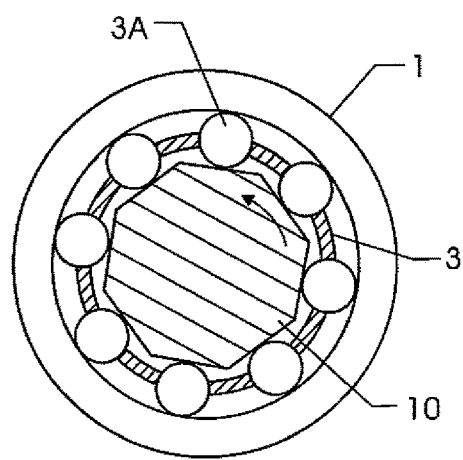
FIG. 21 is a cross sectional view along line C-C of FIG. 12 (in the case of from engine braking returning to two wheel drive state).
Figure 22:
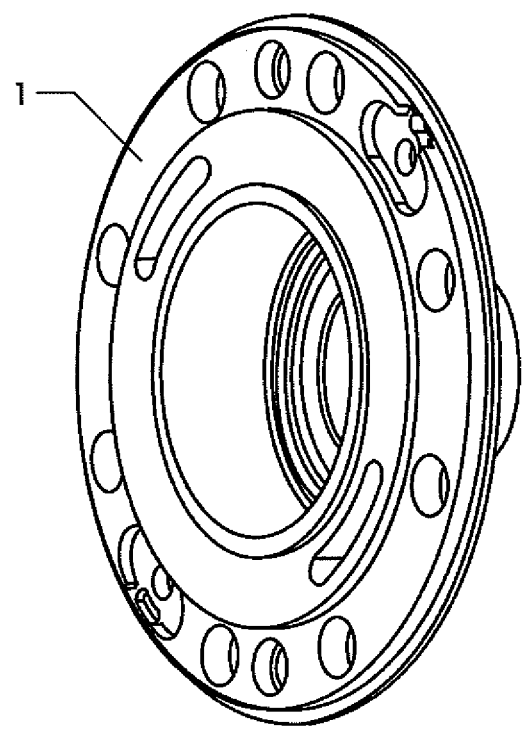
FIG. 22 shows the left input unit of the present invention.
Figure 24:
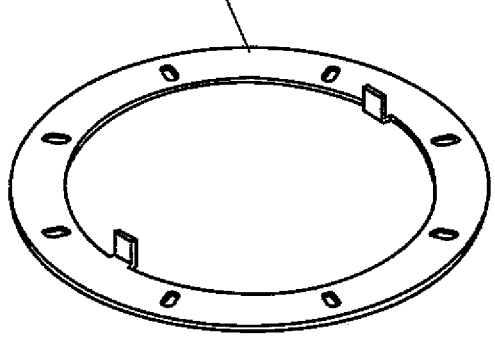
FIG. 24 shows the damping unit of the present invention.
Figure 23:
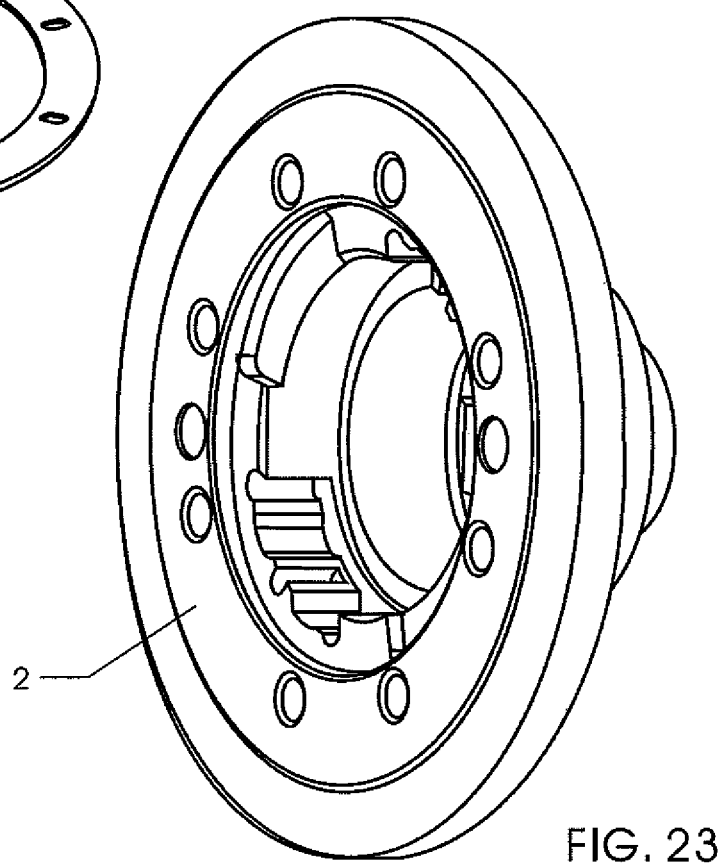
FIG. 23 shows the right input unit of the present invention.

With reference to FIGS. 19 to 21, the engine baking state is converted into the two wheel drive state. In FIG. 19, the external power unit 8 has no power, and the returning spring 71 of the left claw control ring 7 pushes the planet gear 12 to align the notch of the left input unit 1. The planet gear 12 is engaged. The planet gear 12 will drive the sun gear 11 and the inner gear 13 rotate to an engage position. At the same time, the sun gear 11 pushes the left claw control ring 7 to rotate to the original position. Referring to FIG. 20, when the sun gear 11 pushes the left claw control ring 7 to the original position, the left claw control ring 7 pushes away the left claw 5. The returning spring 30 of the left rolling post retainer 3 pushes the left output ring 10 to the notch and aligned thereto. With reference to FIG. 21, the returning spring 30 of the left rolling post retainer 3 pushes the left output ring 10 to the notch of the left rolling post retainer 3 and then aligned, and at the same time, the left output ring 10 pushes away the left rolling post 3A which is disengaged and thus no power is outputted.

With reference to FIG. 31, another embodiment of the present invention is illustrated, which is an embodiment of two wheel drive and four wheel drive. The operation of this embodiment is almost identical to that shown in FIGS. 3 to 11. With reference to FIGS. 31 to 34, the only difference is that the sun gear 11 driving the claw control ring 7 is changed to a linking unit 14 which has no teeth. Therefore, no planet gear 12 is needed. The fixing shaft 120 of the planet gear 12 is changed to the fixing shaft 15 fixed to the left input unit 1 for installing the returning spring 71 of the claw control ring 7. The linking unit 14 is installed with a damping unit 9 for interacting with the external power unit 8. The operation of the linking unit 14 is similar to that of the sun gear 11. That is, it transfers the power from the external power unit 8 to the claw control ring 7. Operations of other elements are identical to those shown in FIGS. 3 to 11.

About mentioned embodiment only shows the operation of moving forward, however, operation of moving backwards is likewise and thus the details will not be further described herein.

In summary, the speed differential device for a common double overrunning clutch of the present invention has the following advantages:

1. A cam is installed to the output ring to promote the strength of whole structure so as to have a higher bearing ability.

2. It is used both in two wheel and four wheel structure, and in two wheel structure with function of engine braking.

3. The disposition of left and right rolling posts to cause that the wheels are locked can be prevented. The speed differential device with a cam can prevent that the speed differential device to be locked due to the transient acceleration, deceleration, and seed reduction in moving forwards and backwards of the speed differential device. Therefore, the present invention provides a safety structure.

4. The structure of the present invention is simple, concrete, and novel.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A speed differential device for a common double overrunning clutch, comprising:
a left input unit (1) and a right input unit (2) being combined together as a combination structure;
a left output unit (10) with a cam unit (101) and a right output unit (20) with a cam unit (201) being installed with the combination structure of the left input unit (1) and the right input unit (2); a left rolling post retainer (3) and a plurality of left rolling posts (3A) being installed between the left input unit (1) and the left output unit (10); a right rolling post retainer (4) and a plurality of right rolling posts (4A) being installed between the right input unit (2) and the right output unit (20); the left rolling post retainer (3) being installed with a left returning spring (30); the right rolling post retainer (4) being installed with a right returning spring (40); the left returning spring (30) and the right returning spring (40) being interacted with a clutch unit; the clutch unit containing a left claw (5), a left claw spring (50), a left ratchet wheel (51), a right claw (6), a right claw spring (60), a right ratchet where (61) and a ratchet claw control ring (7) for controlling synchronous actions of the left claw (5) and the right claw (6).

2. The speed differential device for a common double overrunning clutch as claimed in claim 1, wherein the left claw (5) controlled by the claw control ring (7) is used to buckle the left ratchet wheel (51); a damping unit (9) is installed between the left ratchet wheel (51) and the left rolling post retainer (3).

3. The speed differential device for a common double overrunning clutch as claimed in claim 2, wherein the damping unit is one of a friction sheet, a spring and a magnetic device which can generate damping force.

4. The speed differential device for a common double overrunning clutch as claimed in claim 1, wherein the left claw control ring (7), left rolling post retainer (3) and right rolling post retainer (4) are installed with a returning spring.

5. The speed differential device for a common double overrunning clutch as claimed in claim 1, wherein the claw control ring interacted with an external power unit has a linking rod (70) which is inserted into a notch (140) of an interacted unit (14) so that the claw control ring (7) interacts with the interacted unit; the interacted unit (14) is installed with a protrusion (141), a returning spring (71) of the claw control ring (7) is installed around the left input unit (1) and a fixing shaft (15) is used to install the returning spring (71) of the claw control ring (7), while a protrusion (141) is installed between the fixing shaft (15) and the returning spring (71) of the claw control ring (7), when the interacted unit (14) rotates, the protrusion (141) rotates with the returning spring (71) of the claw control ring (7) so that the returning spring (71) of the claw control ring (7) acts; and the interacted unit (14) is installed with a damping unit (9) for being interacted with the external power unit (8).

6. The speed differential device for a common double overrunning clutch as claimed in claim 1, wherein the claw control ring (7) interacted with an external power unit (8) is interacted with a sun gear; the sun gear (11) is engaged with at least one planet gear (12); the claw control ring (7) has a returning spring (71) which is located at a retaining shaft (120) of the planet gear (12); the sun gear (11) is installed with a damping unit (9) for interacting with the external power unit (8).

7. The speed differential device for a common double overrunning clutch as claimed in claim 1, wherein an outer side of the left input unit (1) and the right input unit (2) has an inner gear which is engaged with a planet gear (12); the inner gear is installed with a damping unit (9) for interacting by an external power unit (8).

* * * * *